US009830236B2

(12) United States Patent
Antony

(10) Patent No.: US 9,830,236 B2
(45) Date of Patent: *Nov. 28, 2017

(54) SYSTEM AND METHOD FOR ASSIGNING MEMORY RESERVED FOR HIGH AVAILABILITY FAILOVER TO VIRTUAL MACHINES

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 13/910,141

(22) Filed: Jun. 5, 2013

(65) Prior Publication Data

US 2014/0365816 A1 Dec. 11, 2014

(51) Int. Cl.
*G06F 11/20* (2006.01)
*G06F 9/455* (2006.01)
*G06F 11/14* (2006.01)

(52) U.S. Cl.
CPC ...... *G06F 11/2043* (2013.01); *G06F 9/45558* (2013.01); *G06F 11/2033* (2013.01); *G06F 11/2046* (2013.01); *G06F 11/1484* (2013.01); *G06F 11/203* (2013.01); *G06F 2009/45583* (2013.01)

(58) Field of Classification Search
CPC ............. G06F 9/45558; G06F 11/1484; G06F 11/203; G06F 11/2033; G06F 11/2043; G06F 11/2046; G06F 2009/45583
See application file for complete search history.

(56) References Cited

U.S. PATENT DOCUMENTS

| 6,075,938 A * | 6/2000 | Bugnion ................. G06F 9/544 703/27 |
| 7,831,634 B2 | 11/2010 | Petev et al. |
| 7,962,566 B2 * | 6/2011 | Smits .................. H04L 67/1008 370/216 |
| 8,407,182 B1 * | 3/2013 | Rajaa et al. .................. 707/610 |
| 8,589,921 B2 * | 11/2013 | Heim .................. G06F 9/45558 718/1 |
| 8,631,131 B2 * | 1/2014 | Kenneth et al. ............. 709/226 |
| 8,806,266 B1 * | 8/2014 | Qu ...................... G06F 11/1438 714/13 |
| 8,874,954 B1 * | 10/2014 | Gupte ................. G06F 11/2028 714/1 |
| 8,930,947 B1 * | 1/2015 | Derbeko et al. .................. 718/1 |
| 9,009,416 B1 * | 4/2015 | Derbeko ............. G06F 12/0888 711/113 |

(Continued)

OTHER PUBLICATIONS

Ye, Kejiang et al. Live Migration of Multiple Virtual Machines with Resource Reservation in Cloud Computing Environments. 2011. 2011 IEEE 4th International Conference on Cloud Computing. pp. 267-274.*

*Primary Examiner* — Matt Kim
*Assistant Examiner* — Paul Contino

(57) ABSTRACT

Techniques for assigning memory reserved for high availability (HA) failover to virtual machines in high availability (HA) enabled clusters are described. In one embodiment, the memory reserved for HA failover is determined in each host computing system of the HA cluster. Further, the memory reserved for HA failover is assigned to one or more virtual machines in the HA cluster as input/output (I/O) cache memory at a first level.

27 Claims, 7 Drawing Sheets

(56) References Cited

U.S. PATENT DOCUMENTS

| | | | |
|---|---|---|---|
| 9,043,533 B1* | 5/2015 | Shajenko, Jr. | G06F 12/0897 711/103 |
| 9,053,033 B1* | 6/2015 | Derbeko | G06F 12/0871 |
| 9,104,529 B1* | 8/2015 | Derbeko | G06F 12/00 |
| 9,213,570 B2 | 12/2015 | Nelson | |
| 9,235,524 B1* | 1/2016 | Derbeko | G06F 12/0866 |
| 2006/0010170 A1* | 1/2006 | Lashley | G06F 12/0813 |
| 2006/0143609 A1* | 6/2006 | Stanev | 718/1 |
| 2006/0155742 A1* | 7/2006 | Stanev | 707/102 |
| 2008/0270674 A1* | 10/2008 | Ginzton | G06F 9/45533 711/6 |
| 2009/0172661 A1* | 7/2009 | Zimmer | G06F 9/45558 718/1 |
| 2010/0070978 A1* | 3/2010 | Chawla | G06F 9/5077 718/105 |
| 2010/0186011 A1 | 7/2010 | Magenheimer | |
| 2010/0268881 A1* | 10/2010 | Galchev | G06F 12/084 711/121 |
| 2010/0332658 A1* | 12/2010 | Elyashev | G06F 9/505 709/226 |
| 2011/0072138 A1* | 3/2011 | Canturk | G06F 9/5011 709/226 |
| 2011/0185064 A1* | 7/2011 | Head | G06F 9/5077 709/226 |
| 2011/0191627 A1* | 8/2011 | Koning et al. | 714/5.1 |
| 2011/0214005 A1 | 9/2011 | Biran et al. | |
| 2011/0239215 A1* | 9/2011 | Sugai | G06F 9/45558 718/1 |
| 2012/0137062 A1* | 5/2012 | Arges et al. | 711/113 |
| 2013/0086298 A1* | 4/2013 | Alanis | G06F 9/4856 711/6 |
| 2013/0086582 A1* | 4/2013 | Cardona | H04L 69/12 718/1 |
| 2013/0283273 A1* | 10/2013 | Miyazaki | G06F 9/45533 718/1 |
| 2013/0339800 A1* | 12/2013 | Lange | 714/41 |
| 2014/0173213 A1 | 6/2014 | Beveridge | |
| 2014/0201302 A1* | 7/2014 | Dube et al. | 709/212 |
| 2014/0344504 A1 | 11/2014 | Luo et al. | |
| 2015/0178109 A1* | 6/2015 | Li | G06F 9/45558 718/1 |
| 2015/0220442 A1* | 8/2015 | Phelan | G06F 12/0868 711/123 |
| 2016/0179564 A1* | 6/2016 | Chen | G06F 12/109 718/1 |

* cited by examiner

SYSTEM AND METHOD FOR ASSIGNING MEMORY RESERVED FOR HIGH AVAILABILITY FAILOVER TO VIRTUAL MACHINES

TECHNICAL FIELD

The present disclosure relates generally to virtual machines and, more particularly, to methods, techniques, and systems for assigning memory reserved for high availability (HA) failover to virtual machines in HA enabled clusters.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "servers"). A group of hardware computing platforms may be organized as a cluster to provide the hardware resources, such as memory, central processing units (CPUs) and so on, for virtual machines.

For virtual machines running mission critical applications, the speed of the storage system needs to be significantly fast. Even if a significant amount of memory and CPU resources are provisioned to the virtual machines running the mission critical applications, there can still be a storage bottle neck.

DETAILED DESCRIPTION

Figure 1:
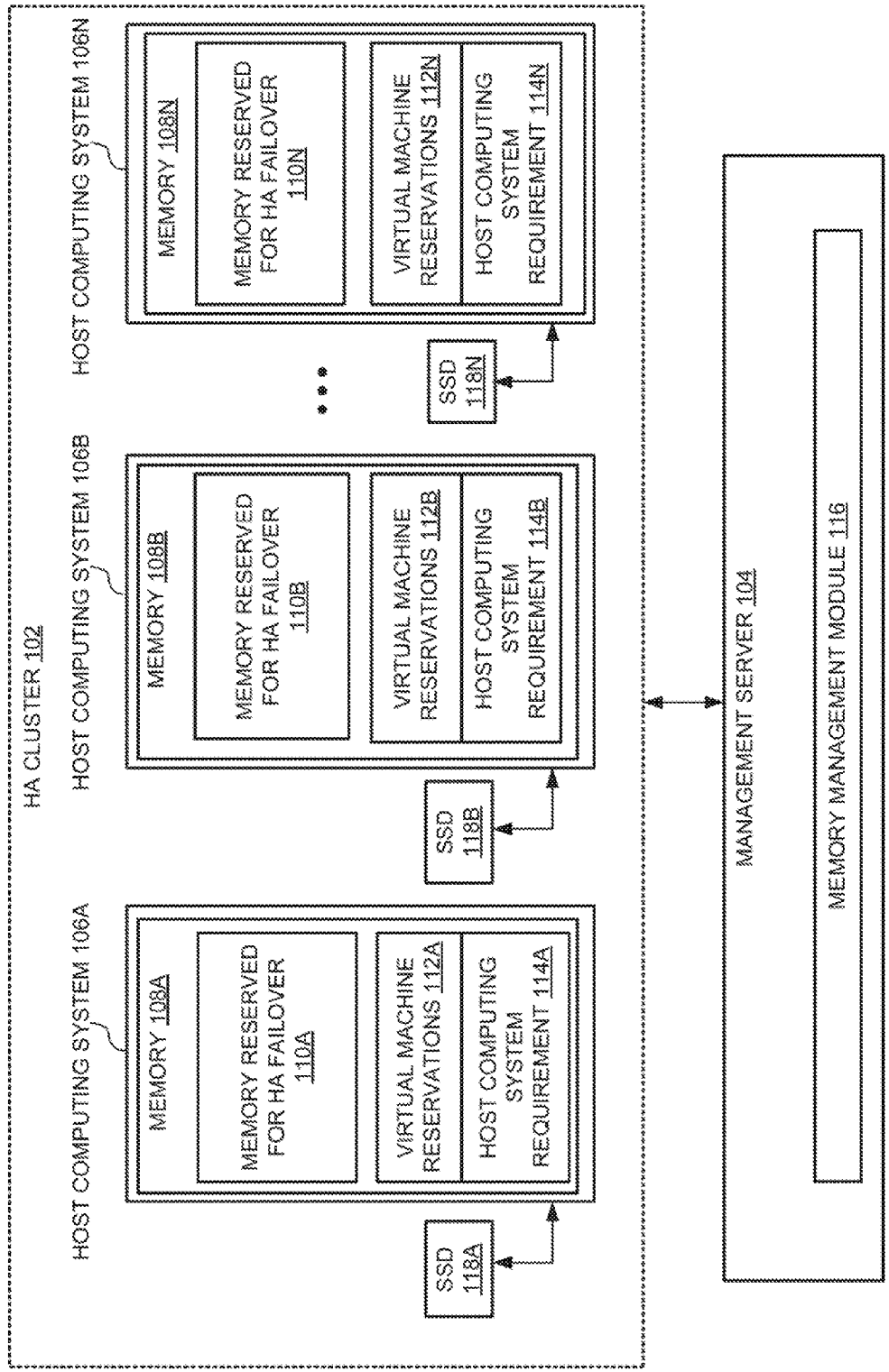
FIG. 1 is a block diagram of a high availability (HA) enabled cluster illustrating memory reserved for HA failover in each host computing system according to an example embodiment.

Embodiments described herein provide enhanced computer-based and network-based methods, techniques, and systems for assigning memory reserved for high availability (HA) failover to virtual machines in HA enabled clusters.

The terms "HA enabled cluster" and "HA cluster" are used interchangeably throughout the document. The term "virtual machine memory" refers to additional physical memory that is assigned to virtual machines running on a host computing system above the virtual machine reservations (i.e., a minimum amount of physical memory that the host computing system reserves for the virtual machine) and below the virtual machine limit (i.e., a maximum amount of physical memory that the host computing system can allocate to the virtual machine) to increase the physical memory used for the virtual machine in the host computing system. It can be noted that other vendors may specify parameters using different terminology and having slightly different functionality. For example, it is known to configure a virtual machine with startup, minimum and maximum memory values.

Furthermore, the term "I/O cache memory" refers to cache memory that is assigned to virtual machines for carrying out all read and write operations to improve the input/output (I/O) performance. Also, the term "memory reserved for HA failover" refers to memory that can be designated as being 'available' in the event of HA failover to accommodate affected virtual machines. In addition, the term "HA failover" refers to failure of at least one physical host computing system in the HA enabled cluster.

In a HA enabled cluster, it is ensured that sufficient resources (e.g., central processing unit (CPU), memory and the like) are available to provide failover protection and that virtual machine resource reservations are respected. In one example, a specified percentage of aggregate CPU and memory resources are reserved for host computing system failover. In another example, a specified number of host computing systems can fail and sufficient resources remain in the cluster to failover all the virtual machines from the host computing systems. For this purpose, some portions of CPU and memory resources are reserved in each host computing system to accommodate affected virtual machines in the event of HA failover.

The proposed technique determines the memory reserved for HA failover in the host computing systems (e.g., ESX hosts) in the HA cluster and uses the memory reserved for HA failover as input/output (I/O) cache memory for the virtual machines using a resource scheduling framework. The proposed technique can also use the memory reserved for HA failover as virtual machine memory and/or scratchpad memory for the virtual machines. In other words, the virtual machine memory and the I/O cache memory can be allocated from the memory reserved for HA failover in the host computing systems, and then the virtual machine memory and the I/O cache memory can be assigned to the virtual machines which require high I/O performance. In addition, when there is a host computing system failure in the HA cluster, all the virtual machine memory above the virtual machine reservations and the I/O cache memory allocated to the virtual machines from the memory reserved for HA failover will be reclaimed by the host computing systems. When the HA cluster is back to normal (i.e., all the host computing systems are back to normal and functioning), the virtual machine memory and the I/O cache memory can be dynamically allocated from the memory reserved for HA failover of the host computing systems. The resource scheduling framework can manage allocation and de-allocation of the memory reserved for HA failover between the virtual machine memory and the I/O cache memory based on requirements of the virtual machines.

System Overview and Examples of Operation

FIG. 1 is block diagram 100 of high availability (HA) enabled cluster 102 illustrating memory reserved for HA failover 110A-N in each of host computing systems 106A-N according to an example embodiment. Particularly, FIG. 1 illustrates HA cluster 102 communicative with management server 104. Further, HA cluster 102 includes host computing systems 106A-N. Furthermore, host computing systems 106A-N can be associated with solid-state drives (SSDs) 118A-N respectively. Also, host computing systems 106A-N include memories 108A-N respectively. As shown in FIG. 1, each of memories 108A-N includes a part of memory for host computing system requirements 114A-N, a part of memory for virtual machine reservations 112A-N, and a part of memory reserved for HA failover 110A-N. Virtual machine reservations 112A-N represent memory that is collectively reserved for all virtual machines executing on each host computing system, and host computing system requirements 114A-N represent memory that is used by other host functions, such as memory used by the virtualization software layer (i.e., the hypervisor).

Figure 5:
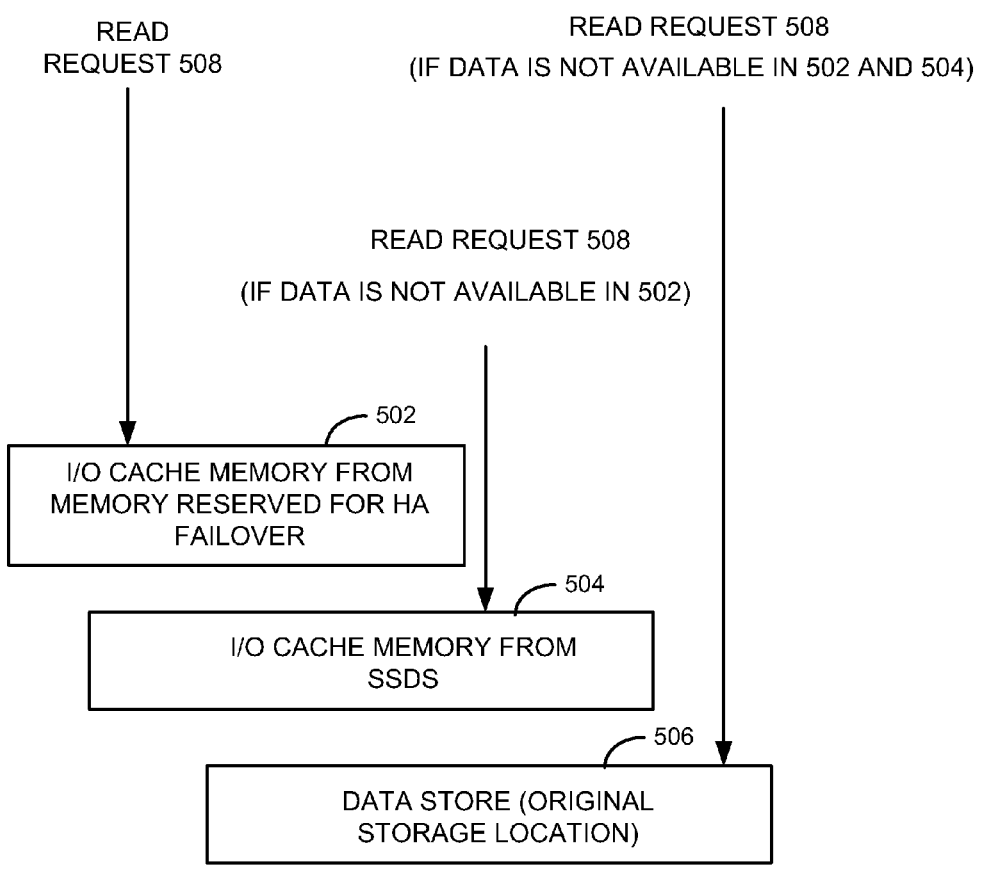
FIG. 5 is a block diagram illustrating a 3-tier hierarchical model for I/O cache memory according to an example embodiment.

Further as shown in FIG. 1, management server 104 includes memory management module 116. Memory management module 116 determines virtual machines in HA cluster 102 which require input/output (I/O) cache memory. Further, memory management module 116 determines memory reserved for HA failover 110A-N in each host computing system 106A-N. At a first level, memory management module 116 assigns memory reserved for HA failover 110A-N to virtual machines in HA cluster 102 as the I/O cache memory based on the requirement of the virtual machines. In addition, memory management module 116 can assign memory reserved for HA failover 110A-N to virtual machines in HA cluster 102 as the virtual machine memory based on the requirement of the virtual machines. One skilled in the art can also envision that memory reserved for HA failover 110A-N can also be assigned to the virtual machines as scratchpad memory. At a second level, SSDs 118A-N can be used as the I/O cache memory (i.e., in addition to assigning memory reserved for HA failover 110A-N) to provide a 3-tier hierarchical model for the I/O cache memory, which is illustrated in FIG. 5.

In one embodiment, memory management module 116 assigns memory reserved for HA failover 110A-N to the virtual machines as the I/O cache memory to improve the I/O performance. In this case, memory management module 116 may assign memory reserved for HA failover 110A-N locally and/or remotely to the virtual machines as the I/O cache memory. For example, memory reserved for HA failover 110A can be assigned as the I/O cache memory locally to the virtual machines running on host computing system 106A and/or remotely to the virtual machines running on other host computing systems 106B-N according to the requirements of the virtual machines.

In another embodiment, memory management module 116 assigns memory reserved for HA failover 110A-N to the virtual machines as the virtual machine memory to supplement virtual machine reservations 112A-N (i.e., memory reserved for HA failover 110A-N can be allocated to a virtual machine up to a virtual machine's limit). In this case, memory management module 116 may assign memory reserved for HA failover 110A-N locally to the virtual machines as the virtual machine memory when the memory reserved for HA failover 110A-N is available (i.e., memory designated for HA failover 110A -N) locally in the respective host computing system. For example, memory reserved for HA failover 110A can be assigned as the virtual machine memory locally to virtual machines running on host computing system 106A according to the requirements of the virtual machines.

In yet another embodiment, memory management module 116 can pull back the virtual machine memory (e.g., the memory reserved for HA failover assigned to a virtual machine between the virtual machine reservation and the virtual machine limit) and then assign it as the I/O cache memory based on the requirements of the virtual machines. In an exemplary implementation, memory reserved for HA failover 110A-N can be assigned remotely to the virtual machines as the I/O cache memory using a remote connection (e.g., remote direct memory access (RDMA)-enabled network connection) and/or live migration of the virtual machines, which is explained in detail in FIGS. 2 and 3 respectively. For example, RDMA-enabled network connection is a mechanism by which remote memory can be included in the local address space via the network interface card (NIC), and live migration of the virtual machines is a mechanism to migrate a virtual machine to a physical host computing system that has sufficient memory reserved for HA failover.

Figure 2:
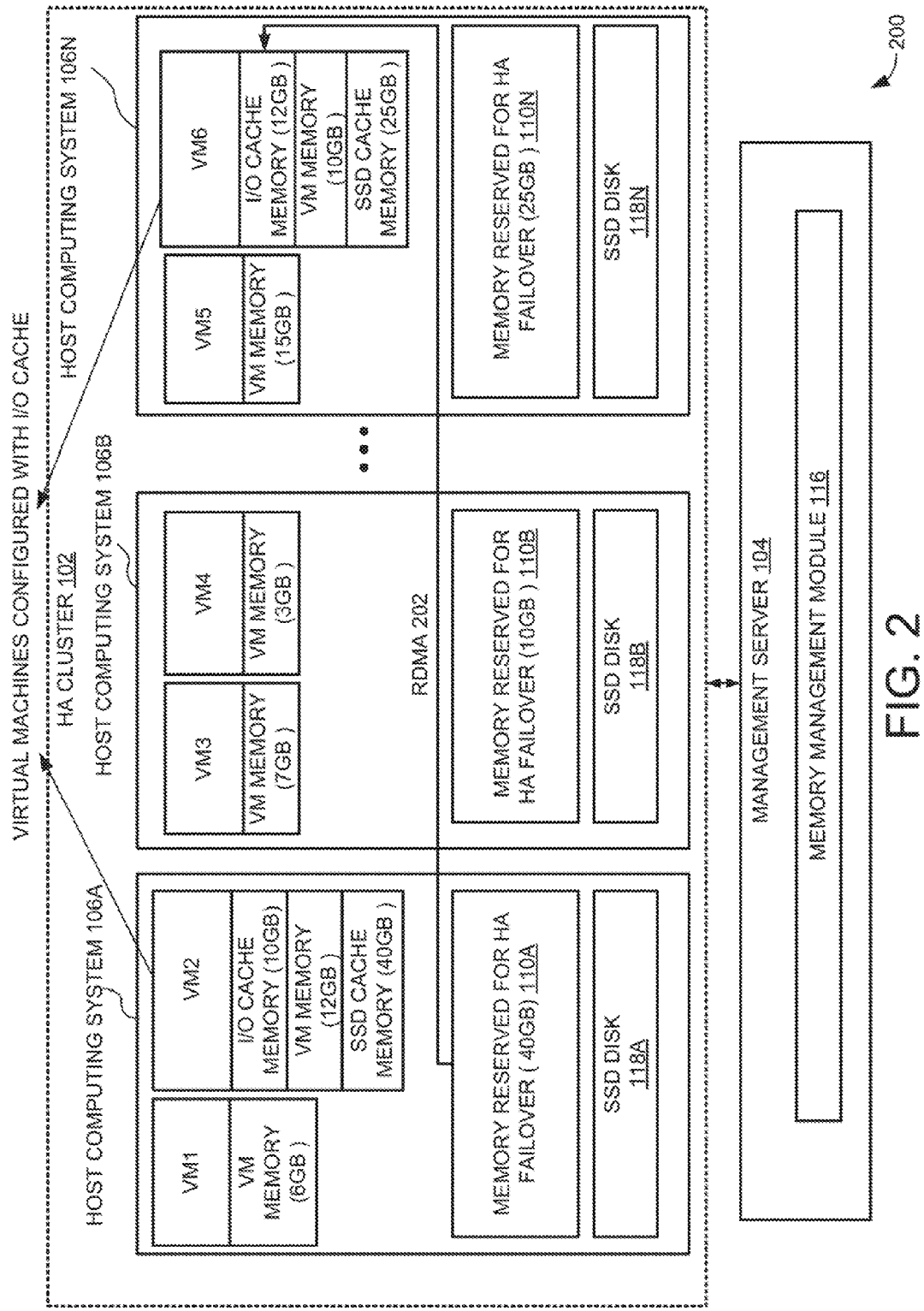
FIG. 2 is a block diagram of the HA enabled cluster illustrating allocating the memory reserved for HA failover to virtual machines as input/output (I/O) cache memory and virtual machine memory according to an example embodiment.

FIG. 2 is block diagram 200 of HA cluster 102 illustrating allocating memory reserved for HA failover 110A-N to virtual machines as the I/O cache memory and the virtual machine memory according to an example embodiment. Particularly, FIG. 2 illustrates assigning memory reserved for HA failover 110A-N locally to virtual machines as virtual machine memory. FIG. 2 also illustrates assigning memory reserved for HA failover 110A-N locally and/or remotely to the virtual machines as the I/O cache memory using RDMA-enabled network connection 202. In addition, FIG. 2 illustrates assigning SSDs 118A-N to virtual machines as the I/O cache memory in addition to assigning memory reserved for HA failover 110A-N to provide a 3-tier hierarchical model for the I/O cache memory.

In the example shown in FIG. 2, memory management module 116 determines that memory reserved for HA failover 110A is 40 GB, memory reserved for HA failover 110B is 10 GB and memory reserved for HA failover 110N is 25 GB. Further, memory management module 116 determines virtual machines VM1-VM6 as requiring virtual machine memory and virtual machines VM2 and VM6 as requiring I/O cache memory. As shown in FIG. 2, host computing system 106A hosts virtual machines VM1 and VM2, host computing system 106B hosts virtual machines VM3 and VM4 and host computing system 106N hosts virtual machines VM5 and VM6.

Further, memory management module 116 assigns memory reserved for HA failover 110A-N locally to the one or more virtual machines VM1-VM6 as the virtual machine memory and the I/O cache memory if memory reserved for HA failover 110A-N is sufficiently available locally in each host computing system.

In the example shown in FIG. 2, out of 40 GB memory reserved for HA failover 110A in host computing system 106A, 6 GB and 12 GB are assigned to virtual machines VM1 and VM2 respectively as the virtual machine memory and 10 GB is assigned to virtual machine VM2 as the I/O cache memory. Further, 7 GB and 3 GB are assigned to virtual machines VM3 and VM4 respectively as the virtual machine memory from 10 GB memory reserved for HA failover 110B.

Furthermore, 15 GB and 10 GB are assigned to virtual machines VM5 and VM6 respectively as the virtual machine memory from 25 GB memory reserved for HA failover 110N. In host computing system 106N, virtual machine VM6 is also configured for I/O cache memory. Since all 25 GB memory reserved for HA failover 110N (i.e., in host computing system 106N) is assigned as the virtual machine memory to virtual machines VM5 and VM6, remaining memory reserved for HA failover 110N is not sufficient/available locally for virtual machine VM6 as the I/O cache memory. In this case, memory management module 116 determines whether the memory reserved for HA failover is available remotely for virtual machine VM6. In this case, memory reserved for HA failover 110A in host computing system 106A is available remotely for virtual machine VM6. Then memory management module 116 determines whether a connection (e.g., RDMA-enabled network connection 202) is available between host computing systems 106A and 106N. If RDMA-enabled network connection 202 is available, then memory management module 116 assigns memory reserved for HA failover 110A in host computing system 106A to virtual machine VM6 as the I/O cache memory using RDMA-enabled network connection 202. In the example shown in FIG. 2, 12 GB is assigned to virtual machine VM6 as the I/O cache memory from 40 GB memory reserved for HA failover 110A. Alternatively, any bus interconnect hardware can also be used to assign memory reserved for HA failover 110A remotely to the virtual machines as the I/O cache memory.

Further in the example shown in FIG. 2, memory management module 116 also assigns 40 GB and 25 GB from SSDs 118A and 118N to respective virtual machines VM2 and VM6 as the I/O cache memory (e.g., SSD cache memory as shown in FIG. 2), in addition to assigning memory reserved for HA failover 110A-N as the I/O cache memory, to provide a 3-tier hierarchical model for the I/O cache memory, which is explained in detail in FIG. 5. If RDMA-enabled network connection 202 connection is not available, then memory reserved for HA failover 110A is assigned to virtual machine VM6 as the I/O cache memory using live migration of the virtual machines, which is explained in detail in FIG. 3.

Figure 3:
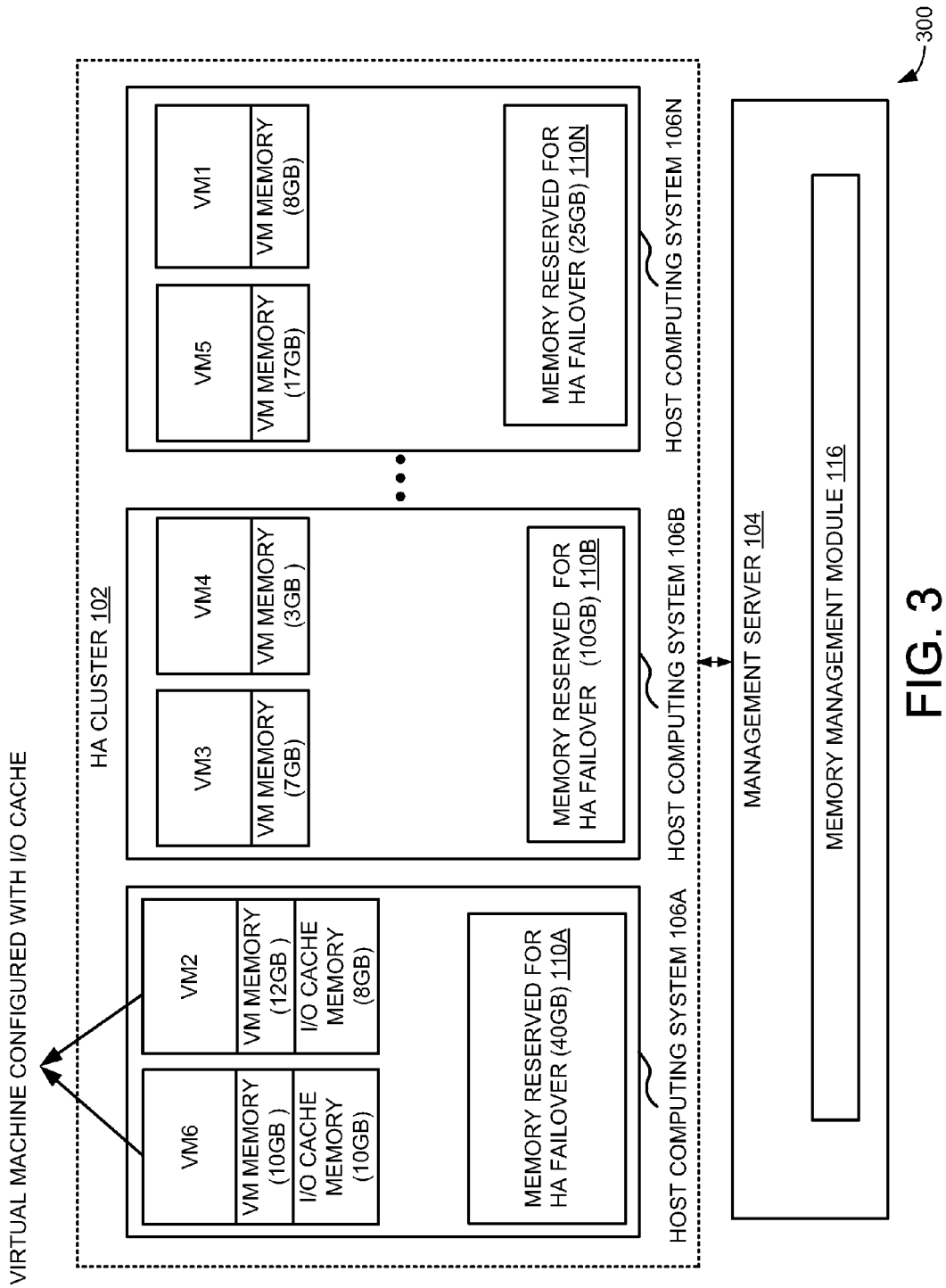
FIG. 3 is another block diagram of the HA enabled cluster illustrating allocating the memory reserved for HA failover to virtual machines as I/O cache memory and virtual machine memory according to an example embodiment.

FIG. 3 is another block diagram 300 of HA cluster 102 illustrating allocating memory reserved for HA failover 110A-N to virtual machines VM1-VM6 as the virtual machine memory and the I/O cache memory according to an example embodiment. Particularly, FIG. 3 illustrates assigning memory reserved for HA failover 110A-N locally to the virtual machines as virtual machine memory. FIG. 3 also illustrates assigning memory reserved for HA failover 110A-N locally to the virtual machines as I/O cache memory using live migration of the virtual machines.

As explained above with respect to FIG. 2, memory management module 116 assigns memory reserved for HA failover 110A-N locally to virtual machines VM1-VM6 as the virtual machine memory and the I/O cache memory if memory reserved for HA failover 110A-N is sufficiently available locally in each host computing system. If memory reserved for HA failover 110A-N is available remotely for virtual machines VM1-VM6, then memory management module 116 live migrates the virtual machines requiring I/O cache memory to host computing systems 106A-N having memory reserved for HA failover 110A-N and assigns memory reserved for HA failover 110A-N locally to the migrated virtual machines as the I/O cache memory.

In the example shown in FIG. 3, virtual machine VM6 is configured to use I/O cache memory. Since the remaining memory reserved for HA failover 110N is not sufficient/available locally for virtual machine VM6 as the I/O cache memory, virtual machine VM6 is live migrated from host computing system 106N to host computing system 106A and then 10 GB of I/O cache memory and 10 GB of virtual machine memory are assigned to virtual machine VM6 from memory reserved for HA failover 110A. The resource scheduling framework dynamically manages the virtual machine memory and the I/O cache memory allocation and de-allocation for the virtual machines based on availability of the memory reserved for HA failover 110A-N, which is explained in detail in FIG. 4. For example, the resource scheduling framework migrates virtual machine VM6 running on host computing system 106N based on availability of computing resources (e.g., central processing unit (CPU) and memory) at destination host computing system 106A, i.e., the resource scheduling framework manages allocation and de-allocation of computing resources to virtual machine VM6.

Figure 4:
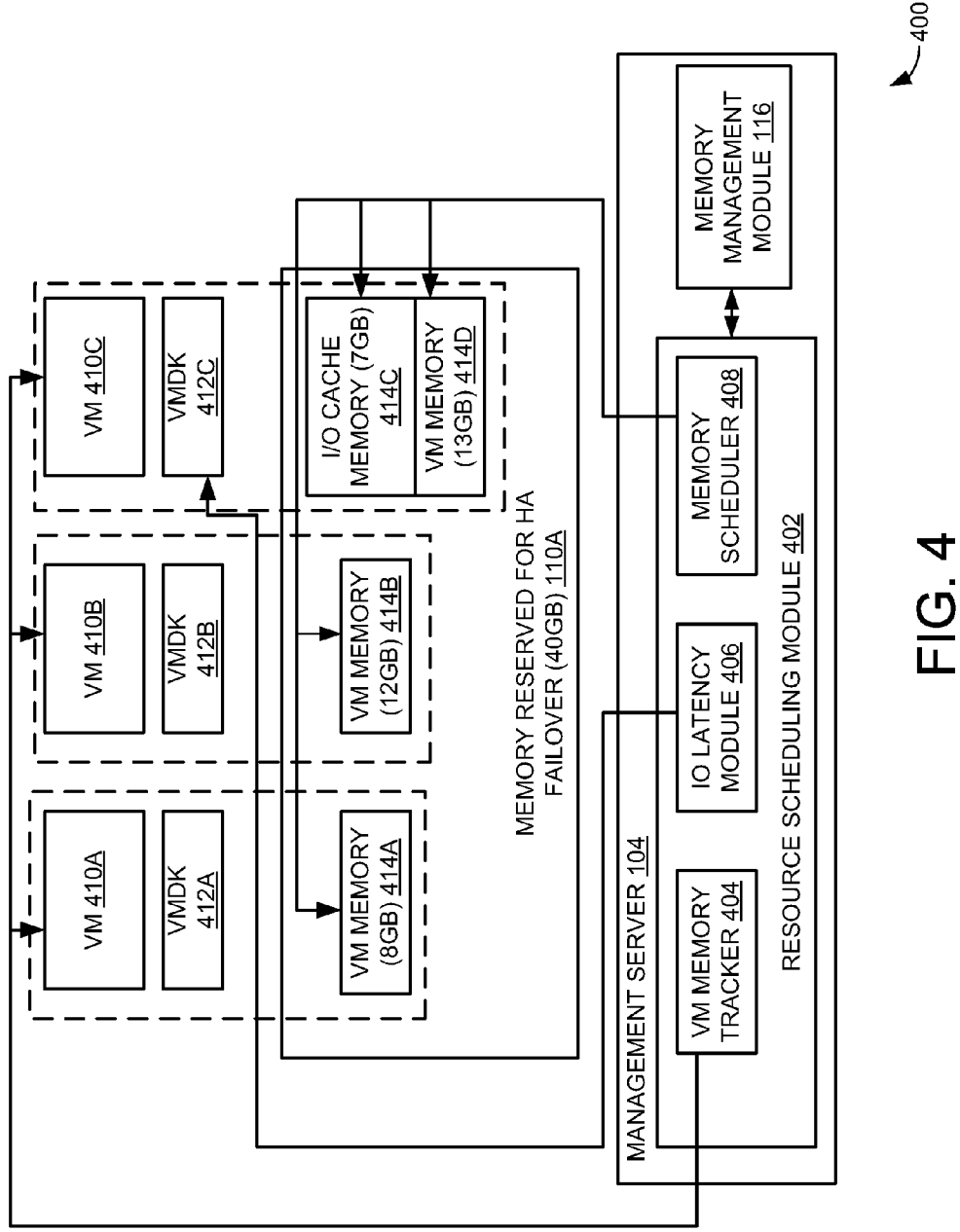
FIG. 4 is an example block diagram showing various components to assign memory reserved for HA failover to virtual machines according to an embodiment.

FIG. 4 is example block diagram 400 showing various components to assign memory reserved for HA failover 110A to virtual machines according to an example embodiment. Particularly, FIG. 4 illustrates management server 104 including resource scheduling module 402 (e.g., resource scheduling framework) and memory management module 116 communicatively coupled to each other to determine an allocation size of the virtual machine memory and the I/O cache memory for virtual machines (e.g., VM 410A-C). Further, resource scheduling module 402 includes VM memory tracker 404, I/O latency module 406 and memory scheduler 408.

In operation, memory scheduler 408 monitors and maintains the virtual machine memory allocation and I/O cache memory allocation to each virtual machine. Further, memory management module 116 provides information about the virtual machines (e.g., VMs 410A-C) which are configured with virtual machine memory and I/O cache memory. Furthermore, I/O latency module 406 continuously monitors the I/O latency for all data stores in the HA cluster on which virtual machine disks (VMDKs) 412A-C resides (e.g., in milliseconds) for a predetermined time interval (e.g., 8 hours) and then computes an average of the I/O latency. In addition, the VM memory tracker 404 keeps track of the memory usage of the virtual machines above the reservations for the predetermined time interval and computes an average of the memory usage. Based on a value generated from the I/O latency and the memory usage, memory scheduler 408 assigns specific amount of memory as the virtual machine memory and/or the I/O cache memory for virtual machines 410A-C.

In the example shown in FIG. 4, out of 40 GB memory reserved for HA failover 110A, 8 GB is assigned to virtual machine VM 410A as virtual machine memory 414A, 12 GB is assigned to virtual machine VM 410B as virtual machine memory 414B, and 13 GB and 7 GB are assigned to virtual machine VM 410C as virtual machine memory 414D and I/O cache memory 414C respectively (e.g., as shown in dotted lines in FIG. 4) using resource scheduling module 402 and memory management module 116.

FIG. 5 is block diagram 500 illustrating a 3-tier hierarchical model for I/O cache memory according to one embodiment. Particularly, FIG. 5 illustrates the 3-tier hierarchical model of the I/O cache memory created using memory reserved for HA failover at first level, SSDs at a second level, and a data store at a third level. In operation, when read request 508 is issued, I/O cache memory 502 created using the memory reserved for HA failover is read for serving read request 508 at the first level. If data is not available in I/O cache memory 502 created using the memory reserved for HA failover, then I/O cache memory 504 created from the SSDs is read for serving the I/O request at the second level. If data is not available in both I/O cache memories 502 and 504, then the data needs to be recomputed or fetched from data store 506 (i.e., original storage location) at the third level.

Example Processes

Figure 6:
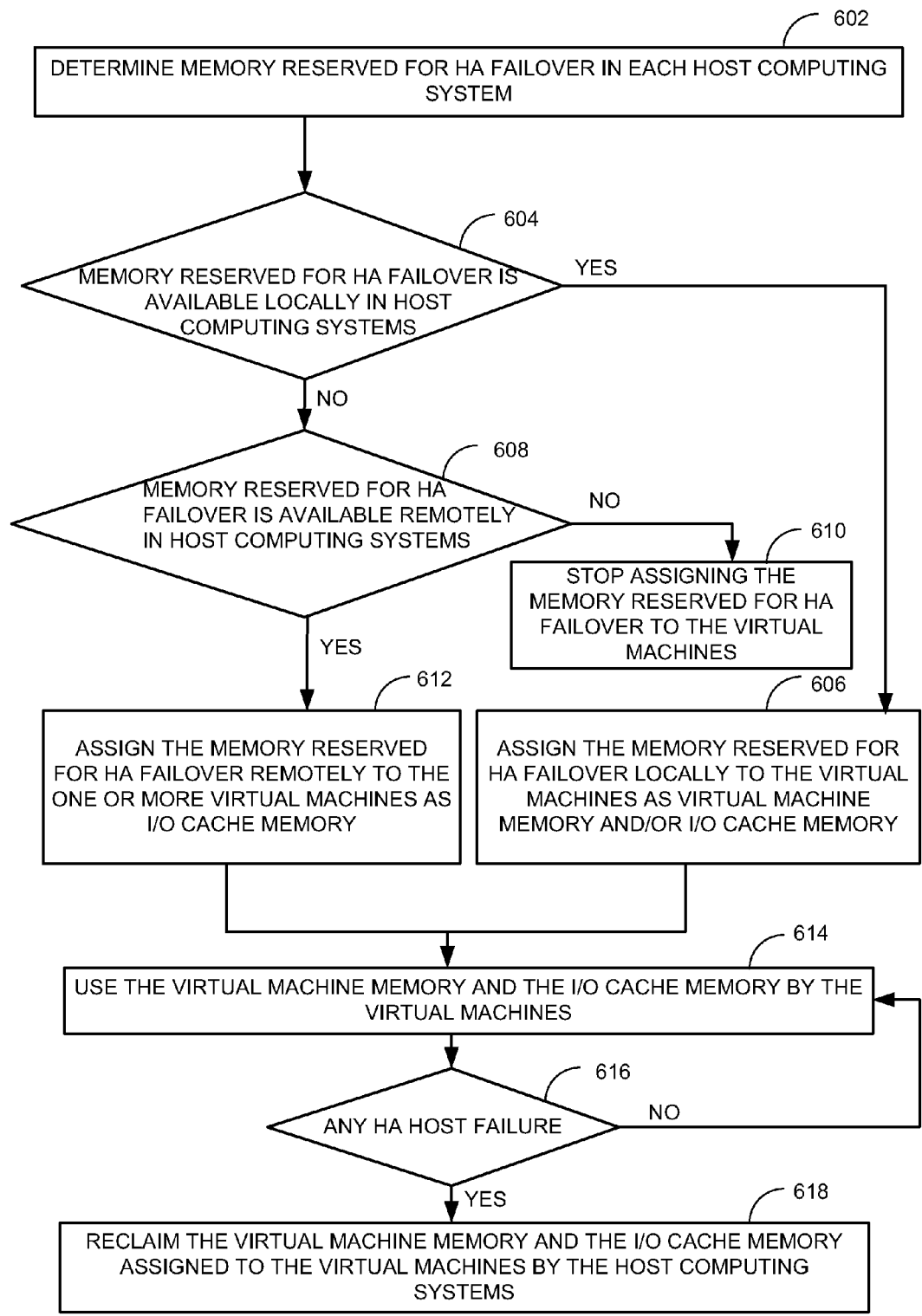
FIG. 6 is a flow diagram for assigning memory reserved for high availability (HA) failover to virtual machines in a HA cluster according to an example embodiment.

FIG. 6 is flow diagram 600 for assigning memory reserved for high availability (HA) failover to virtual machines in a HA cluster according to an example embodiment. At step 602, memory reserved for HA failover is determined in each host computing system of the HA cluster. At step 604, the memory reserved for HA failover is assigned to one or more virtual machines in the HA cluster as input/output (I/O) cache memory. In addition to assigning memory reserved for HA failover as the I/O cache memory at a first level, the solid-state drives (SSDs) or a portion of the SSDs can also be assigned to the virtual machines in the HA cluster as the I/O cache memory at a second level to provide a 3-tier hierarchical model for the I/O cache memory (e.g., as explained with respect to FIG. 5).

In one exemplary implementation, a first virtual machine requiring the I/O cache memory is determined in the HA cluster. Further, a check is made to determine whether the memory reserved for HA failover is available locally (i.e., memory designated for HA failover) in a host computing system hosting the first virtual machine. If the memory reserved for HA failover is available locally in the host computing system hosting the first virtual machine, the memory reserved for HA failover is locally assigned to the first virtual machine as the I/O cache memory. If the memory reserved for HA failover is not sufficient/available locally in the host computing system hosting the first virtual machine, then a check is made to determine whether the memory reserved for HA failover is available remotely in any other host computing systems. If the memory reserved for HA failover is available remotely in any other host computing systems, the memory reserved for HA failover is remotely assigned to the first virtual machine as the I/O cache memory.

In one embodiment, if a connection (e.g., remote direct memory access (RDMA)—enabled network connection) is available between the host computing systems in the HA cluster, the memory reserved for HA failover is remotely assigned to the first virtual machine as the I/O cache memory using the connection. This is explained in detail with respect to FIG. 2. One skilled in the art can envision that any bus interconnect hardware or remote memory access mechanism can also be used to assign the memory reserved for HA failover remotely to the virtual machines as the I/O cache memory.

In another embodiment, the first virtual machine is live migrated to any other host computing system having the memory reserved for HA failover if the RDMA-enabled network connection and/or the bus interconnects are not available between the host computing systems. Further, the memory reserved for HA failover is locally assigned to the migrated first virtual machine as the I/O cache memory. This is explained in detail with respect to FIG. 3. This process is repeated for all the virtual machines requiring the I/O cache memory. If the memory reserved for HA failover is not available remotely, assigning the memory reserved for HA failover to the virtual machines is terminated by notifying that the memory reserved for HA failover is not available for assigning as the I/O cache memory.

At step 606, the memory reserved for HA failover can be assigned to one or more virtual machines in the HA cluster as virtual machine memory. In one example, a first portion of the memory reserved for HA failover is locally assigned to the virtual machines as the virtual machine memory and/or the I/O cache memory, and a second portion of the memory reserved for HA failover is remotely assigned to the virtual machines as the I/O cache memory using the resource scheduling module (e.g., as explained with respect to FIG. 4).

In other words, the memory reserved for HA failover can be locally assigned to the virtual machines as the virtual machine memory (e.g., in addition to assigning the memory reserved for HA failover as the I/O cache memory) if the memory reserved for HA failover is available locally in each host computing system. A resource scheduling framework assigns the memory reserved for HA failover to the virtual machines in the HA cluster between the I/O cache memory and the virtual machine memory.

At step 608, the virtual machines use the assigned virtual machine memory for applications running therein and assigned I/O cache memory for read and write operations to improve their performance until a host computing system fails. In one example, a memory management module (e.g., memory management module 116 of FIGS. 1-4) dynamically monitors the host computing systems in the HA cluster to determine any HA failover in the HA cluster. At step 610, the virtual machine memory and the I/O cache memory assigned to the virtual machines are reclaimed by each host computing system in the event of the HA failover in the HA cluster.

In one example embodiment, the memory reserved for HA failover that is assigned as the virtual machine memory is reclaimed from the virtual machines using a memory ballooning mechanism. In another example embodiment, the memory reserved for HA failover that is assigned as the I/O cache memory is reclaimed from the virtual machines by discarding the I/O cache memory after committing pending write operations from the I/O cache memory to a persistent storage (e.g., hard disks, optical storage disks, magnetic tape drives, magneto-optical disks, non-volatile, random access memory (NVRAM), and FLASH read-only memory (ROM)). Further, when the HA cluster is back to normal (i.e., the failed host computing system is back to normal), the virtual machine memory and/or the I/O cache memory can be dynamically created from the memory reserved for HA failover in the host computing systems.

The systems and methods as described in FIGS. 1-6 improve I/O performance of the virtual machines. For example, the performance of the I/O cache memory created using the memory reserved for HA failover can be better than the I/O cache memory created using SSDs because the speed of physical memory (i.e., memory reserved for HA failover in the host computing system) is significantly faster than the SSDs. The systems and methods as described in FIGS. 1-6 also improve utilization of memory resources.

Example Computing System Implementation

Figure 7:
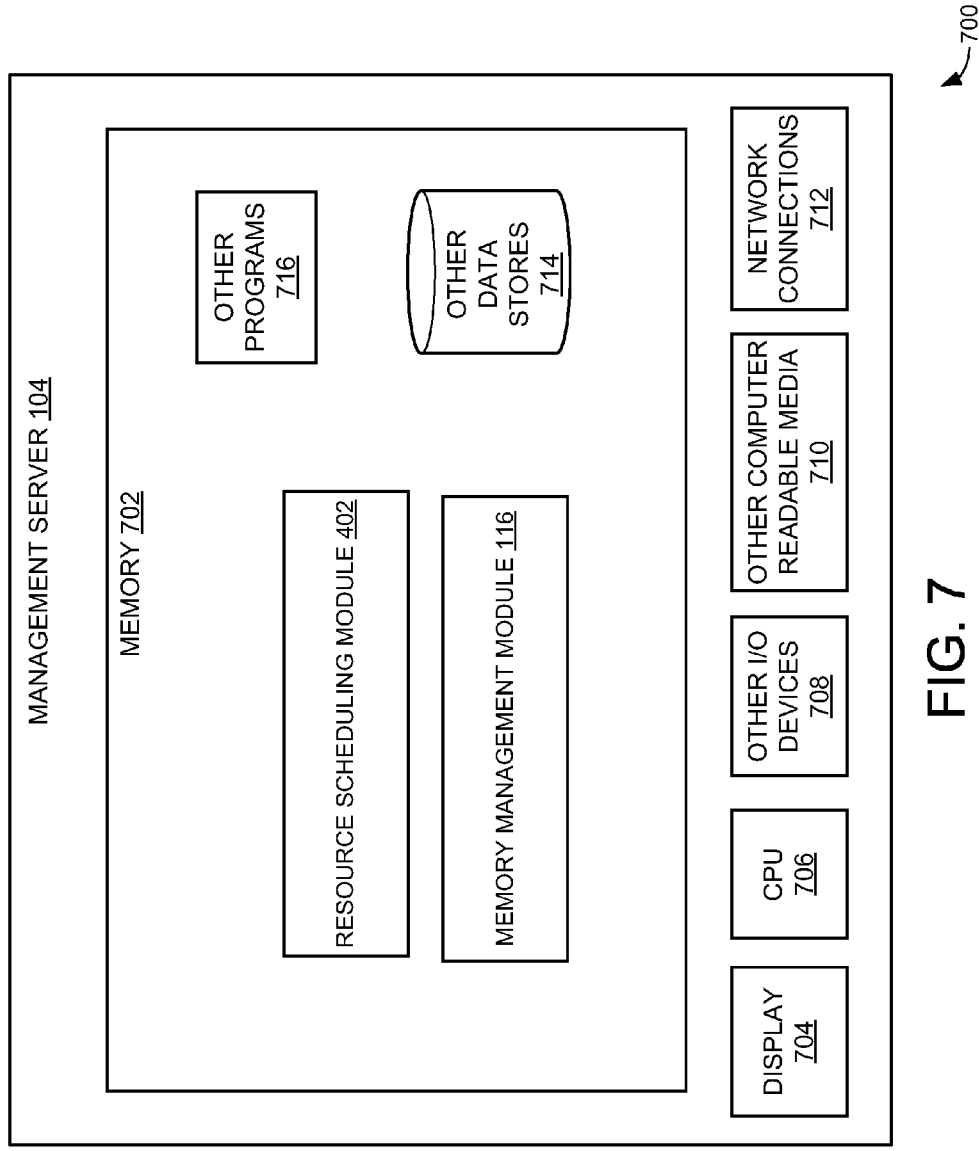
FIG. 7 is a block diagram of an example management server including a memory management module according to an example embodiment.

FIG. 7 is block diagram 700 of an example management server (such as management server 104 shown in FIGS. 1-4) including memory management module 116 according to an example embodiment. In particular, FIG. 7 shows management server 104 (e.g., a computing system) that may be utilized to implement memory management module 116 and resource scheduling module 402.

Note that one or more general purpose virtual or physical computer systems suitably instructed may be used to implement memory management module 116 and resource scheduling module 402. In addition, management server 104 may comprise one or more distinct computing systems/devices and may span distributed locations. Furthermore, each block shown may represent one or more such blocks as appropriate to a specific embodiment or may be combined with other blocks. Also, memory management module 116 and resource scheduling module 402 may be implemented in software, hardware, firmware, or in some combination to achieve the capabilities described herein.

In the embodiment shown, management server 104 may comprise computer memory ("memory") 702, display 704, one or more Central Processing Units ("CPU") 706, input/output devices 708 (e.g., keyboard, mouse, etc.), other computer-readable media 710, and network connections 712. Memory management module 116 and resource scheduling module 402 are shown residing in memory 702. The components of memory management module 116 and/or resource scheduling module 402 may execute on one or more CPUs 706 and implement techniques described herein. Other code or programs 716 (e.g., an administrative interface, a Web server, and the like) and potentially other data repositories, such as data store 714, may also reside in memory 702, and execute on one or more CPUs 706. One or more of the components in FIG. 7 may not be present in any specific implementation. For example, some embodiments may not provide other computer readable media 710 or display 704.

Memory management module 116 and/or resource scheduling module 402 interact via network with host computing systems in the HA cluster. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed, memory management module 116 dynamically allocates the memory reserved for HA failover to the virtual machines in the HA cluster as virtual machine memory and/or I/O cache memory at a first level of hierarchy. Further, memory management module 116 dynamically allocates the SSDs to the virtual machines in the HA cluster as the I/O cache memory at a second level of hierarchy.

The components of memory management module 116 and resource scheduling module 402 may record and/or communicate various types of information, including activity information (e.g., indications of importance, indications of activities occurring on virtual machines, indications of application actions/events and/or virtual machine/desktop states that may be used to determine the occurrence of an activity), resource allocation information (e.g., indications of shares or reservations assigned to particular virtual machines), and the like. Activity information written to data store 714 may be persisted to other computer readable media 710 or to a remote persistent memory storage location (not shown).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of resource scheduling module 402 and memory management module 116, such as in data store 714, can be available by standard mechanisms such as through C, C++, C#, and Java APIs; libraries for accessing files, databases, or other data repositories; through scripting languages such as XML; or through Web servers, FTP servers, or other types of servers providing access to stored data. Data store 714 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, web services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of resource scheduling module 402 and memory management module 116 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for assigning memory reserved for high availability (HA) failover, comprising:
   determining the memory reserved for HA failover in a first host computing system of a HA cluster, wherein the memory reserved for HA failover is memory that is reserved in the first host computing system in the HA cluster to accommodate affected virtual machines in an event of HA failover, wherein the HA failover is a failure of any host computing system in the HA cluster;
   determining a first virtual machine, which requires input/output (I/O) cache memory to improve I/O performance, running in a second host computing system of the HA cluster;
   when there is no failure of any host computing system in the HA cluster, remotely assigning, at a first level, the memory reserved for HA failover in the first host computing system to the first virtual machine running on the second host computing system as I/O cache memory for carrying, out read and write operations to improve the I/O performance of the first virtual machine; and
   when there is a failure of a host computing system in the HA cluster, reclaiming, by the first host computing system, the memory reserved for HA failover that is remotely assigned as the I/O cache memory from the first virtual machine to accommodate virtual machines of the failed host computing system.

2. The method of claim 1, further comprising:
   repeating the steps of claim 1 for each virtual machine requiring the I/O cache memory.

3. The method of claim 1, wherein remotely assigning the memory reserved for HA failover to the first virtual machine as the I/O cache memory, comprises one of:
   assigning the memory reserved for HA failover remotely to the first virtual machine as the I/O cache memory using a connection between the first host computing system having the memory reserved for HA failover and the second host computing system; and
   live migrating the first virtual machine to the first host computing system having the memory reserved for HA failover and assigning the memory reserved for HA failover locally to the migrated first virtual machine as the I/O cache memory.

4. The method of claim 3, wherein remotely assigning the memory, reserved for HA failover to the first virtual machine as the I/O cache memory using the connection between the first host computing system having the memory reserved for HA failover and the second host computing system, comprises:
   assigning the memory reserved for HA failover remotely to the first virtual machine as the I/O cache memory using a remote direct memory access (RDMA)-enabled network connection between the first host computing system and the second host computing system.

5. The method of claim 1, further comprising:
   assigning a first portion of the memory reserved for HA failover locally to a second virtual machine running on the first host computing system as at least one of the I/O cache memory and a virtual machine memory; and
   assigning a second portion of the memory reserved for HA failover remotely to the first virtual machine running on the second host computing system as the I/O cache memory.

6. The method of claim 5, wherein the memory reserved for HA failover is assigned to the second virtual machine in the HA cluster between the I/O cache memory and the virtual machine memory using a resource scheduling framework.

7. The method of claim 5, further comprising:
   reclaiming the I/O cache memory and the virtual machine memory assigned to the second virtual machine by the first host computing system when there is a failure of any host computing system in the HA cluster.

8. The method of claim 7, wherein reclaiming the virtual machine memory comprises:
   reclaiming the virtual machine memory from the second virtual machine by the first host computing system using a memory ballooning mechanism.

9. The method of claim 7, wherein reclaiming the I/O cache memory comprises:
   discarding the I/O cache memory associated with the first and second virtual machines after committing pending write operations from the I/O cache memory to a persistent storage; and
   reclaiming the memory reserved for HA failover from the first and second virtual machines by the first host computing system upon discarding the I/O cache memory.

10. The method of claim 1, further comprising:
    assigning one or more solid-state drives (SSDs) or a portion of the one or more SSDs to the first virtual machine in the HA cluster as the I/O cache memory at a second level.

11. A system comprising:
    one or more high availability (HA) clusters, each HA cluster including a plurality of host computing systems with each host computing system including virtual machines running therein; and
    a management server communicative with the one or more HA clusters, wherein the management server includes a memory management module to:
      determine memory reserved for HA failover in a first host computing system of a HA cluster of the one or more HA clusters, wherein the memory reserved for HA failover is memory that is reserved in the first host computing system in the HA cluster to accommodate affected virtual machines in an event of HA failover, wherein the HA failover is a failure of any host computing system in the HA cluster;
      determine a first virtual machine, which requires input/output (I/O) cache memory to improve I/O performance, running in a second host computing system of the HA cluster;
      when there is no failure of any host computing system in the HA cluster, remotely assign, at a first level, the memory reserved for HA failover in the first host computing system to the first virtual machine running on the second host computing system as I/O cache memory for carrying out read and write operations to improve the I/O performance of the first virtual machine; and when there is a failure of a host computing system in the HA cluster, enable the first host computing system to reclaim the memory reserved for HA failover that is remotely assigned as the I/O cache memory from the first virtual machine to accommodate affected virtual machines of the failed host computing system.

12. The system of claim 11, wherein the memory management module is further configured to:
repeat the steps of claim 11 for each virtual machine requiring the I/O cache memory.

13. The system of claim 11, wherein the memory management module remotely assigns the memory reserved for HA failover to the first virtual machine as the I/O cache memory using a connection between the first host computing system having the memory reserved for HA failover and the second host computing system.

14. The system of claim 13, wherein the memory management module remotely assigns the memory reserved for HA failover to the first virtual machine as the I/O cache memory using a remote direct memory access (RDMA)-enabled network connection between the first host computing system and the second host computing system.

15. The system of claim 11, wherein the memory management module live migrates the first virtual machine to the first host computing system having the memory reserved for HA failover and assigns the memory reserved for HA failover locally to the migrated first virtual machine as the I/O cache memory.

16. The system of claim 11, wherein the memory management module assigns a first portion of the memory reserved for HA failover locally to a second virtual machine running on the first host computing system as at least one of the I/O cache memory and a virtual machine memory, and assigns a second portion of the memory reserved for HA failover remotely to the first virtual machine running on the second host computing system as the I/O cache memory.

17. The system of claim 16, wherein the memory management module enables the first host computing system to reclaim the I/O cache memory and the virtual machine memory assigned to the second virtual machine in the event of the HA failover in the HA cluster.

18. The system of claim 11, further comprising:
one or more solid-state drives (SSDs), wherein the memory management module assigns the one or more SSDs or a portion of the one or more SSDs to the first virtual machine in the HA cluster as the I/O cache memory at a second level.

19. A non-transitory computer-readable storage medium including instructions that are configured, when executed by a computing system, to perform a method for assigning memory reserved for high availability (HA) failover, the method comprising:
determining the memory reserved for HA failover in a first host computing system of a HA cluster, wherein the memory reserved for HA failover is memory that is reserved in the first host computing system in the HA cluster to accommodate affected virtual machines in an event of HA failover, wherein the HA failover is a failure of any host computing system in the HA cluster;
determining a first virtual machine, which requires input/output (I/O) cache memory to improve (I/O) performance, running in a second host computing system of the HA cluster;
when there is no failure of any host computing system of the HA cluster, remotely assigning, at a first level, the memory reserved for HA failover in the first host computing system to the first virtual machine running on the second host computing system as I/O cache memory for carrying out read and write operations to improve the I/O performance of the first virtual machine; and
when there is a failure of a host computing system in the HA cluster, enabling the first host computing system to reclaim the memory reserved for HA failover that is remotely assigned as the I/O cache memory from the first virtual machine to accommodate affected virtual machines of the failed host computing system.

20. The non-transitory computer-readable storage medium of claim 19, further comprising:
repeating the steps of claim 19 for each virtual machine requiring the I/O cache memory.

21. The non-transitory computer-readable storage medium of claim 19, wherein remotely assigning the memory reserved for HA failover to the first virtual machine as the I/O cache memory, comprises one of:
assigning the memory reserved for HA failover remotely to the first virtual machine as the I/O cache memory using a connection between the first host computing system having the memory reserved for HA failover and the second host computing system; and
live migrating the first virtual machine to the first host computing system having the memory reserved for HA failover and assigning the memory reserved for HA failover locally to the migrated first virtual machine as the I/O cache memory.

22. The non-transitory computer-readable storage medium of claim 21, wherein remotely assigning the memory reserved for HA failover to the first virtual machine as the I/O cache memory using the connection between the first host computing system having the memory reserved for HA failover and the second host computing system, comprises:
assigning the memory reserved for HA failover remotely to the first virtual machine as the I/O cache memory using a remote direct memory access (RDMA)-enabled network connection between the first host computing system and the second host computing system.

23. The non-transitory computer-readable storage medium of claim 19, further comprising instructions to:
assign a first portion of the memory reserved for HA failover locally to a second virtual machine running on the first host computing system as at least one of the I/O cache memory and a virtual machine memory; and
assigning a second portion of the memory reserved for HA failover remotely to the first virtual machine running on the second host computing system as the I/O cache memory.

24. The non-transitory computer-readable storage medium of claim 23, wherein the memory reserved for HA failover is assigned to the second virtual machine in the HA cluster between the I/O cache memory and the virtual machine memory using a resource scheduling framework.

25. The non-transitory computer-readable storage medium of claim 23, further comprising:
reclaiming the I/O cache memory and the virtual machine memory assigned to the second virtual machine by the first host computing system in the event of the HA failover in the HA cluster.

26. The non-transitory computer-readable storage medium of claim 25, wherein reclaiming the I/O cache memory comprises:

discarding the I/O cache memory associated with the first and second virtual machines after committing pending write operations from the I/O cache memory to a persistent storage; and reclaiming the memory reserved for HA failover from the first and second virtual machines by the first host computing system upon discarding the I/O cache memory.

27. The non-transitory computer-readable storage medium of claim 19, further comprising:

assigning one or more solid-state drives (SSDs) or a portion of the one or more SSDs to the first virtual machine in the HA cluster as the I/O cache memory at a second level.

* * * * *